April 5, 1955 A. ALARCAO 2,705,429
VARIABLE-RATIO POWER TRANSMISSION GEARING
Filed Oct. 3, 1951 2 Sheets-Sheet 1

Inventor
Americo Alarcao
by Sommers & Young
Attorneys

2,705,429

VARIABLE-RATIO POWER TRANSMISSION GEARING

Américo Alarcão, Lourenco Marques, Portuguese East Africa

Application October 3, 1951, Serial No. 249,430

Claims priority, application Great Britain October 13, 1950

4 Claims. (Cl. 74—688)

This invention relates to improvements in variable-ratio power transmission gearing and has for an object to provide an improved form of transmission giving any required ratio over a wide range of values.

The invention is especially intended to be applied to engines or machines running at substantially constant speed from which a variable output torque is required, and particularly to such engines running at high speeds (1000 revolutions per minute and over). It is thus applicable to the transmission systems of motor vehicles, in which the engine speed generally varies over a comparatively small range, but a very wide range of torque values may be required.

For many years the conventional friction clutch and gear-box have been used for this purpose in motor vehicles, though having the obvious disadvantage of being able to provide only a limited number of widely-spaced transmission ratios.

Various hydraulic transmission systems have been proposed to replace the friction clutch and, in some cases, the gear-box also. By allowing a degree of "slip" between the driving and driven elements of such a system various transmission ratios can be obtained, though if the degree of slip is too great a large amount of power may be lost, which renders the system unsuitable for the replacement of the gear-box.

According to the invention, a variable-ratio power transmission gearing comprises an hydraulic transmission device or similar device adapted for transmitting power from the driving side to the driven side thereof with a degree of slip dependent on the conditions of operation, in combination with a differential or epicyclic gear assembly which is connected to the driving and driven sides of the transmission device and to the output shaft and which ensures that the driven side of the said device is driven at a speed which is not less than a fixed proportion of the speed of the driving side, whereby the output shaft can be driven at a speed which may have any value between zero and the speed of the said driving side, depending on the conditions of operation.

The driving side of the hydraulic transmission device may be directly connected to one concentric wheel of the differential gear assembly, the planet-wheel carrier being arranged to drive the driven side of the said device and the second concentric wheel being arranged to drive the output shaft of the transmission system.

To obtain the choice of forward, neutral or reverse gear a drum may be mounted on the planet-wheel carrier and a brake arranged to be applicable to it for halting the motion of the planet-carrier and thus reversing the direction of the motion of the second concentric wheel and, consequently, of the drive.

One embodiment of the invention as applied to the transmission systems of motor vehicles will now be described by way of example with reference to the accompanying drawings, in which.

Figure 1:
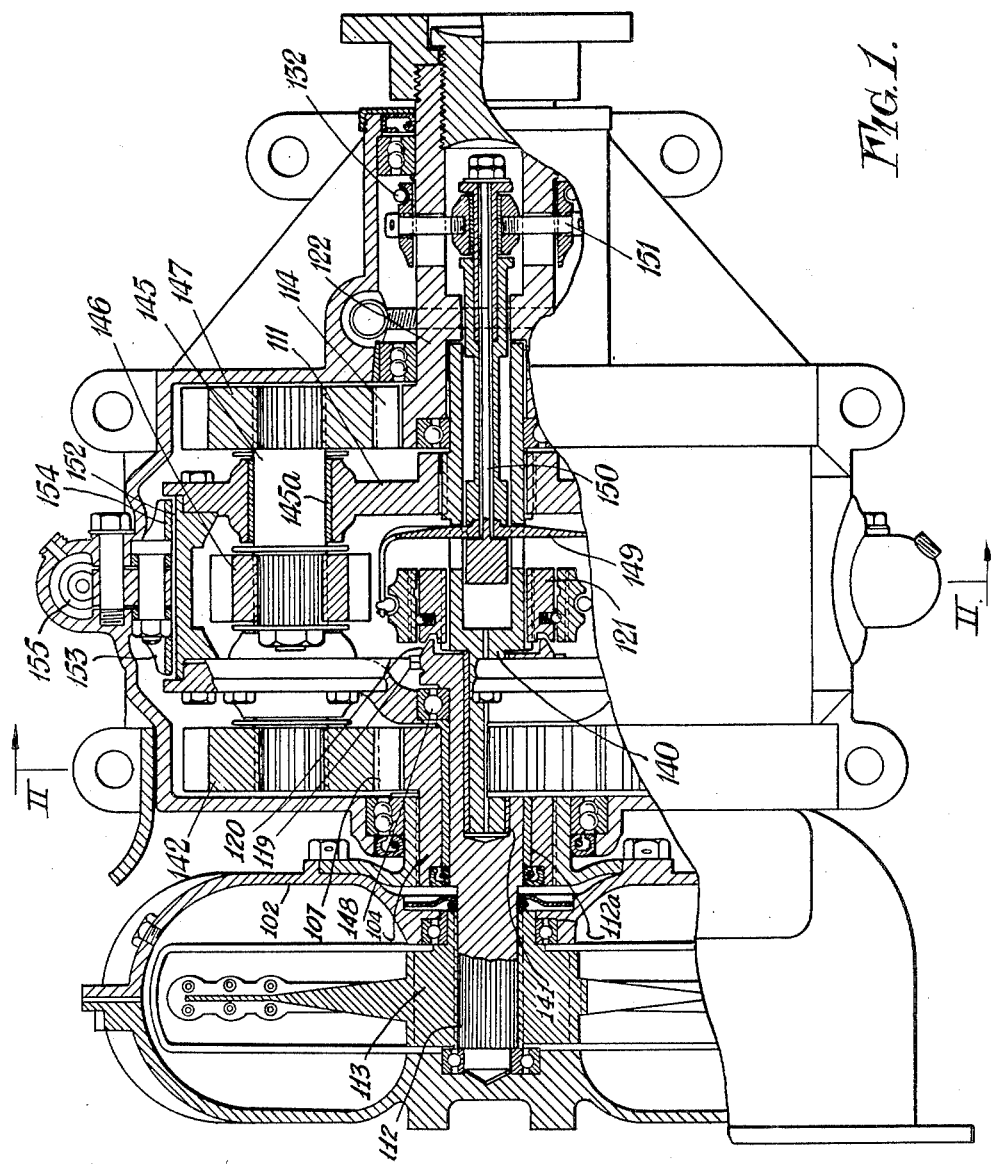
Figure 1 is a plan view, partly in horizontal axial section, of one embodiment.
Figure 2:
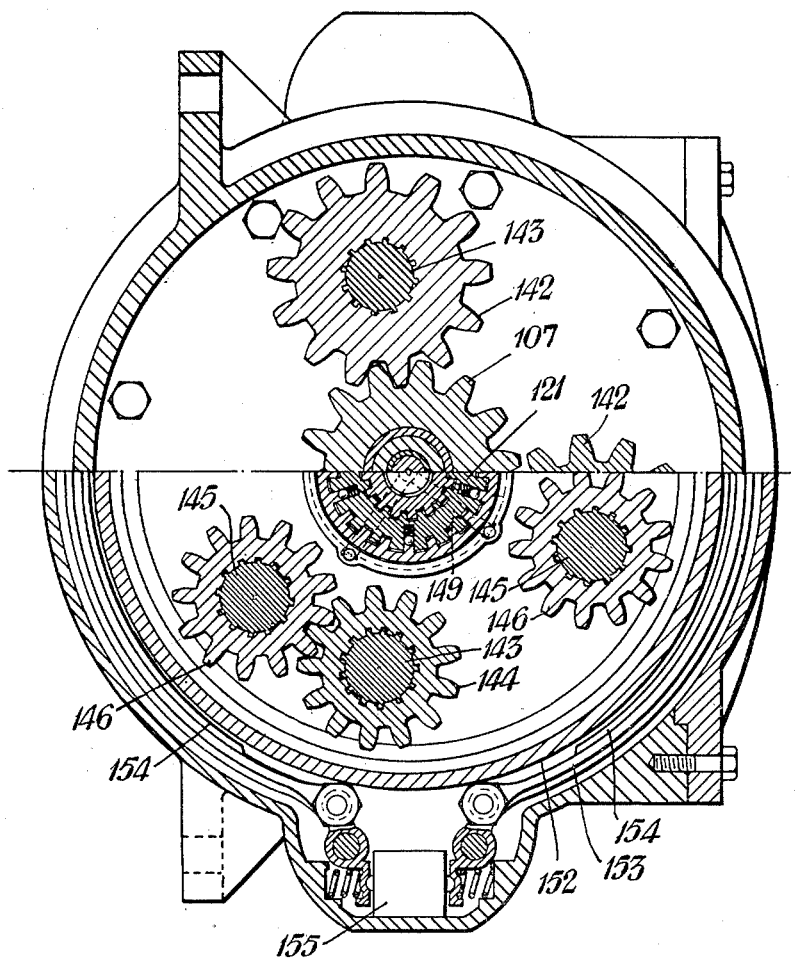
Figure 2 is a cross-section on the line II—II of Figure 1.

In this embodiment, a tubular shaft 104 is attached to the driving side 102 of an hydraulic transmission member or fluid coupling which is driven by the engine crank-shaft, and the driven side 113 is splined to a shaft 112 running within the tubular shaft 104 in plain bearings 112ª. The dog-clutch and synchronising cone formations 119 and 120, respectively, for engagement with the dog-clutch member 121, are provided on the end of the shaft 112. The member 121 has two positions, those of engagement with or disengagement from the shaft 112, and it is splined to a short shaft 140 which has the planet-carrier 111 splined on it and which, at its forward end, is supported in plain bearings 141 within the hollow end of the shaft 112. The planet-carrier 111 carries three sets of planetary gears (Fig. 2), each set consisting of a pinion 142 meshing with a gear-wheel 107 on the end of the shaft 104, a short shaft 143 (Fig. 2) supported on the planet-carrier 111 and carrying the pinion 142 and a further pinion 144, and a second short shaft 145 similarly supported in bearings 145ª and carrying a pinion 146, meshing with the pinion 144, and another pinion 147 meshing with a gear-wheel 114 on the annular output shaft 122. Ball-bearings 148 support the forward end of the planet-carrier 111 on the shaft 112.

The member 121 is operated by a spider 149 through a rod 150 moving in a bore in the shaft 140, the rod 150 being operated in turn through a yoke 151, mounted by a bearing on the said rod and moved longitudinally by means of a fork 132.

For driving the vehicle, the member 121 is engaged with the shaft 112, thus locking the planet-carrier 111 with the driven member 113 of the fluid coupling. The system operates as follows: When the engine of the vehicle is started, the driving side 102 of the fluid coupling, the tubular shaft 104 and the sun-wheel 107 rotate at the same speed as the engine crankshaft. Assuming the vehicle to be at rest and the member 121 in engagement with the shaft 112, the gear-wheel 114 is held against rotation by the load of the vehicle while the planet-carrier 111 and, consequently, the driven side 113 of the fluid coupling, rotate at half the crankshaft speed due to the ratio of the gearing. At idling speeds of the engine, the torque transmitted through the fluid coupling is insufficient to cause any increase in the speed of the driven side of the coupling, but as the engine is speeded up more torque is transmitted and the driven side of the fluid coupling is forced to rotate at more than half the crankshaft speed, due to the tendency to reduce the slip between the driving and driven sides. In order for it to be able to do this, it is necessary that the planet-carrier 111 should rotate at more than half the speed of the gear-wheel 107 and therefore, owing to the inherent characteristics of a differential or epicyclic gearing of this type, the gear-wheel 114 must commence to rotate and, in consequence, the output shaft 122. The vehicle therefore commences to move, its speed at any moment being dependent on the speed of the engine and the degree of slip in the fluid coupling.

When the vehicle is travelling at constant speed on a level road, the torque required at the road wheels is not large and the slip in the fluid coupling is almost non-existent, so that the gear-wheels 107 and 114 and the planet-carrier 111 rotate at almost the same speed and the drive is substantially direct. When a greater torque is required, as for acceleration or hill-climbing, the engine is accelerated so that the slip in the fluid coupling is increased and the epicyclic gearing commences to act as a reduction gearing, thereby automatically reducing the drive ratio until a position of equilibrium between the torque required and that delivered at the road wheels is attained.

As will be realised, the degree of slip in the fluid coupling is never more than 50% due to the ratio and type of gearing used, so that the fluid coupling is acting in its more efficient range as a torque transmitter. The overall transmission ratio, however, can be reduced to any required extent.

The effects of neutral and reverse gears of a conventional gear box are simply obtained. For reverse gear, a drum 152 is mounted on the outside of the planet-carrier 111 and a contracting band brake 153 with friction linings 154 and operating cylinder 155 is arranged to act on the drum 152 under the control of the driver. The effect of applying this brake, which may also be used as a transmission brake, is to halt the planet-carrier's motion so that the gear-wheel 114 commences to rotate in the opposite direction to the gear-wheel 107, thus reversing the drive. Neutral is obtained by withdrawing the member 121 from engagement with the shaft 112, so leaving the planet-carrier 111 free to rotate.

It will be understood that, in accordance with the invention, the fluid coupling may have any suitable form.

I claim:

1. A variable-ratio power transmission gearing comprising a fluid coupling device having driving and driven sides, the degree of slip between such sides being dependent on the conditions of operation, and a differential gear assembly having a first concentric wheel, a tubular shaft connecting said first concentric wheel to said driving side, a second concentric wheel connected to the output shaft of the gearing, a plurality of planet-wheels meshing with said concentric wheels, a carrier for said planet-wheels, a shaft to which said carrier is fixedly attached, a further shaft connected to said driven side and passing through the tubular shaft, dog-clutch formations on said further shaft, and a sliding dog-clutch member mounted upon the carrier shaft for locking said carrier shaft to said further shaft.

2. A gearing according to claim 1, comprising also a drum mounted externally upon the planet-wheel carrier and a contracting band brake capable of acting on said drum.

3. A gearing according to claim 1, comprising also an operating rod for the sliding dog-clutch member, said operating rod passing through a bore in the shaft to which the carrier is attached.

4. A gearing according to claim 1, wherein the planet-wheel carrier carries three sets of planet gears, each set comprising a first pinion mounted on a first short shaft and meshing with the first concentric wheel, a second pinion mounted on the said first shaft, a third pinion meshing with the second pinion, a second short shaft carrying the third pinion, and a fourth pinion also mounted on the second shaft and meshing with the second concentric wheel.

References Cited in the file of this patent

UNITED STATES PATENTS

| | | |
|---|---|---|
| 45,260 | McCleane | Nov. 29, 1864 |
| 688,899 | Thomas | Dec. 17, 1901 |
| 801,501 | Baker | Oct. 10, 1905 |
| 991,809 | Tillinghast et al. | May 9, 1911 |
| 2,129,884 | Swan | Sept. 13, 1938 |
| 2,196,585 | Gette | Apr. 9, 1940 |
| 2,277,214 | Dodge | Mar. 24, 1942 |
| 2,283,486 | Berry | May 19, 1942 |
| 2,284,934 | Watson | June 2, 1942 |
| 2,311,150 | Buraczyhski | Feb. 16, 1943 |
| 2,349,642 | Watson | May 20, 1944 |
| 2,454,014 | Seybold | Nov. 16, 1948 |
| 2,494,466 | Wolf | Jan. 10, 1950 |